/ United States Patent (12)
Todd

(10) Patent No.: US 7,054,486 B2
(45) Date of Patent: May 30, 2006

(54) IMAGE PROCESSING METHOD, SYSTEM, COMPUTER PROGRAM AND DATA CARRIER

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/062,368

(22) Filed: Jan. 31, 2002

(65) Prior Publication Data
US 2003/0068086 A1   Apr. 10, 2003

(30) Foreign Application Priority Data
Oct. 5, 2001   (GB) .................................... 0123946

(51) Int. Cl.
G06K 9/34   (2006.01)
(52) U.S. Cl. ...................................... 382/173
(58) Field of Classification Search ................ 382/173, 382/176, 177, 180, 225
See application file for complete search history.

(56) References Cited

U.S. PATENT DOCUMENTS 4,484,081 A    11/1984  Cornyn, Jr. et al.
4,718,090 A     1/1988  Cooper, Jr.
4,742,551 A *   5/1988  Deering ....................... 382/170
4,847,786 A *   7/1989  Wang et al. ................ 382/171
5,642,288 A     6/1997  Leung et al.
5,841,903 A *  11/1998  Kikuchi ....................... 382/203
5,982,916 A    11/1999  Kuhn

FOREIGN PATENT DOCUMENTS

EP    0 629 078 A1   11/1993
EP    0 923 044 A2   11/1997
EP    0 932 115 A2    1/1998
EP    0 949 579 A2    4/1998
GB       1605010 A   12/1981
GB       2202112 A    9/1988

* cited by examiner

Primary Examiner—Vikkram Bali
Assistant Examiner—Colin LaRose
(74) Attorney, Agent, or Firm—Herman Rodriquez

(57) ABSTRACT

An image processing system is arranged to process an array of pixels. The array is scanned in a sequential manner, pixel by pixel, each pixel being scanned only once. The resulting scan data is processed to identify pixels which contain image information of significance, and to assign these pixels to an image segment which may contain a number of such pixels. The system provides a data output of summary information pertaining to the segment or segments identified in the image. In this way a segmentation scan is performed which is very efficient and which produces summary information without a further processing step.

7 Claims, 1 Drawing Sheet

```
-------      -------       --------11-
--111---     ---222---     ----22--11-
---111--     -33!22---     -333+222#1-
---11---     -22222---     -?11111111-
```

IMAGE PROCESSING METHOD, SYSTEM, COMPUTER PROGRAM AND DATA CARRIER

FIELD OF THE INVENTION

This invention relates to image processing, and particularly but not exclusively to the ability to perform quickly a simple analysis of certain image features.

BACKGROUND OF THE INVENTION

In the field of this invention it is known that there are many image segmentation (the identification and mapping of image segments) techniques already in use, for example in the fields of medical imaging and security applications. Typically an identified segment relates to a portion of an image which is of particular significance (such as a vehicle or person in the case of security applications). Segmentation algorithms (and related edge detection algorithms) are well known in the art.

However, these known approaches have the disadvantage that the segmentation algorithms are complex and generally require a large amount of computation time. It will be appreciated that where real-time input is taken from a moving image, the speed of segmentation is critical. Also, the result typically shows the different segments of the image. However in some applications only a statistical summary of the segment information is required, and therefore more data is provided than is actually required, which wastes computation time. Furthermore, in those applications which need only summary information, extracting this from a full segmentation is an additional computational step.

An example of an application which uses summary segmentation is a computer input device. A camera captures an image input, for example that of fingers pressing on a screen. This is used to generate summary information about the location, orientation and size (relating to pressure) of the finger marks. These are then used to control computer applications, such as computer art or music.

A need therefore exists for an image processing method, system, computer program and data carrier wherein the abovementioned disadvantages may be alleviated.

STATEMENT OF INVENTION

In accordance with a first aspect of the present invention there is provided a method of image processing for processing a plurality of pixels representing at least a portion of an image by scanning a pixel in the plurality of pixels to determine if the pixel contains image information of significance; if the pixel contains image information of significance, determining if only an immediately previously scanned single pixel (single pixel) contains image information of significance; if the single pixel contains image information of significance, assigning the pixel to an existing image segment of the single pixel; if the single pixel does not contain image information of significance, creating a new image segment and assigning the pixel to the new image segment; in response to assigning the pixel to an existing image segment or to creating a new image segment, updating inertia information for either the new image segment or the existing image segment, respectively; if only a single, previously scanned pixel adjacent to the pixel (adjacent pixel), that is not the single pixel, contains image information of significance, and if the adjacent pixel is assigned to an image segment that does not include the pixel, then merging the new image segment or the existing image segment, respectively, that includes the pixel, with the image segment. These steps are repeated for the next sequential pixel of the plurality of pixels.

The processing arrangement preferably determines whether each pixel containing image information of significance has at least one contiguous pixel assigned to a segment, in order to determine to which of the at least one segment the pixel shall be assigned.

Preferably at least two segments are selectively merged to form a single segment in dependence upon whether one pixel containing image information of significance is contiguous with at least two pixels each assigned to a different one of the at least two segments.

The segment information of the at least one contiguous assigned pixel is preferably determined using a buffer register which stores segment information for the pixels of the previous line. Preferably the at least one contiguous assigned pixel is above a pixel in the array. Alternatively the at least one contiguous assigned pixel is to the left of a pixel in the array.

Preferably a register is kept of the at least one image segment, the register including cumulative pixel value information and segment location information regarding the at least one segment.

Preferably the register is further arranged to include x-axis and y-axis cumulative coordinate values of the at least one segment. The x-axis and y-axis cumulative coordinate values preferably include x-axis*x-axis, x-axis*y-axis, and y-axis*y-axis summation values.

Preferably the addition of a pixel to one of the at least one segment includes the assimilation of coordinate values for the pixel into the registers for the one of the at least one segment.

Preferably the at least one segment comprises at least two segments, and the merging of two of the at least two segments includes the assimilation of corresponding coordinate values for the two of the at least two segments into the coordinate values of a single merged segment.

Preferably the summation information and location information regarding the at least one segment are used after a complete scan to compute the centre and size of the at least one segment.

The additional coordinate values are preferably used to compute shape and orientation approximations for the at least one segment. Preferably the image represents human computer input.

In this way, a simple segmentation algorithm is provided which provides a statistical summary of image segments and which requires a relatively short computation time, without an additional computational step. Therefore it is particularly advantageous in applications where summary segment information is required from a real-time moving image.

BRIEF DESCRIPTION OF THE DRAWINGS

One single scan image segmentation and summarisation incorporating the present invention will now be described, by way of example only, with reference to the accompanying drawings, in which:

FIG. 1 shows an illustrative flow diagram of a portion of an image processing method in accordance with the invention.

DESCRIPTION OF A PREFERRED EMBODIMENT

Figures 2, 3, 4:
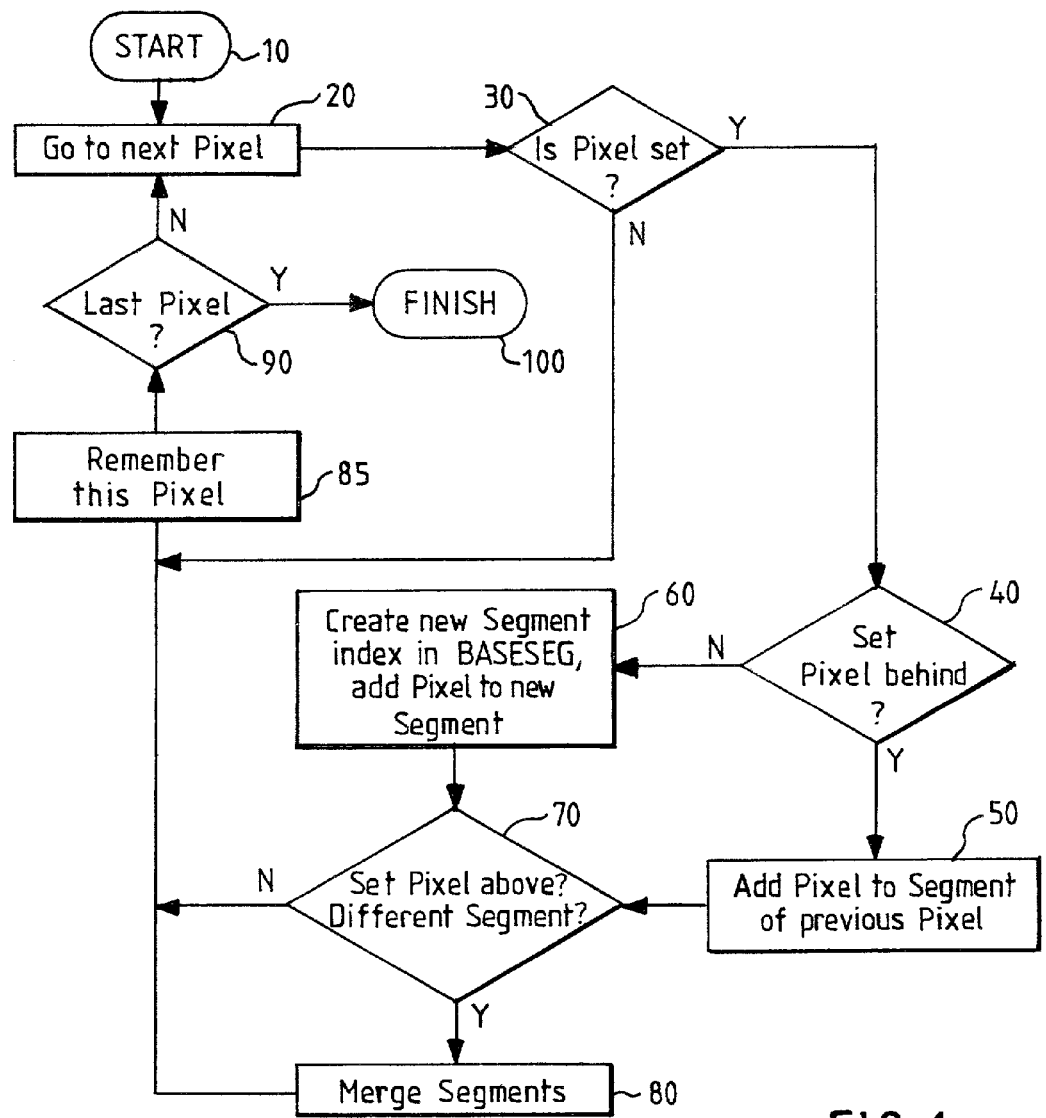
FIGS. 2, 3 and 4 show example pixel arrays of segments illustrating the image processing method shown partially in FIG. 1.

Referring to FIG. 1, there is shown an illustrative flow diagram of an image processing algorithm forming part of a larger image processing program (not shown). The algorithm and program may be stored in the memory of a computer system or may be recorded on a data carrier, preferably a machine-readable recording medium such as, for example, optical or magnetic media. Example program code illustrating the invention is provided in Appendix 1below. The program is designed to identify segments in an image and to summarise the size, position and orientation of each segment. Image segments relate to portions of the image which are of particular interest or significance to the user or application using the image, as compared to the 'background' of the image which is of less significance. In the case of security applications for example, the image may depict vehicles or individuals, and the location of these in the image constitute the image segments.

The algorithm depicted in FIG. 1 operates on one line of pixels in an array of pixels which constitute the image; the program executes the algorithm for each line of the image, and processes data generated by the algorithm in a manner to be further described below.

At the start of the algorithm, (box 10 of FIG. 1) the scanning of a new line of the image commences. At box 20, the next pixel (in the first iteration this is the first pixel) is scanned. Then at box 30, a simple bi-level pixel level identification is performed: 0 (black, not set) background, 1 (white, set) foreground. It will be appreciated that this may also operate with simple extensions to multi-colour segmentation. In this way for each pixel a data result of 'set' (1) or 'not set' (0) is recorded in dependence upon the pixel light/colour level.

If the pixel in question is not set, this indicates that the pixel is not part of any segment; therefore the algorithm proceeds to box 90, where if there are no more pixels in the line, the algorithm finishes (box 100). Otherwise, the algorithm proceeds to the next pixel (box 20) and the above process is repeated for the second pixel in the line, and so on until the end of the line is reached.

If the pixel in question is 'set', this indicates that it is part of a segment. It is then necessary to determine whether the previous pixel in the line is also 'set' (box 40). This information is stored in an array 'LASTLINE', which stores a segment number for each pixel in the current line before the current scan point (those pixels already scanned), and above the current line from the current scan point onwards. In other words, during a scan the elements in LASTLINE before the x-axis value of the current scan point refer to the line currently being scanned. In particular, at a given x-axis value X, LASTLINE[X−1] refers to the pixel immediately to the left of the current pixel, whereas LASTLINE[X] refers to the pixel immediately above the current pixel. The elements from the x-axis value of the current scan point onwards refer to the previous line. This means that the array LASTLINE need only have as many elements as there are pixels in the X-axis of the array.

A value of 0 in LASTLINE is taken to indicate 'background' or 'no segment', and no statistics are kept. Before the first scan line is processed, LASTLINE is initialised to all 0s.

Accumulated statistical information for segments is stored in inertia arrays described below. Each array holds one array element for each segment, indexed by segment number.

To allow for the merging of segments, the algorithm holds a register array BASESEG. This contains a value for each segment created, initially the number of the segment itself. Where two segments (S1 and S2) are merged, the inertia information for the two segments are assimilated into the inertia information for the first segment (S1), and the inertia information for the second segment (S2) is no longer used. BASESEG[S2] is set to S1. A base segment is identified by BASESEG[SEG]==SEG.

From box 40, if the pixel immediately before this pixel is set, (as determined using LASTLINE[X−1]) the new pixel will be part of the same segment as the previous pixel (CURSEG=BASESEG[LASTLINE[X]), (box 50). If the pixel immediately before this pixel is not set, a new segment is initiated (box 60). In either case, the segment is recorded in CURSEG.

In this way the algorithm scans the run of set pixels in the given scan line starting at X. For each pixel, inertia information (to be further described below) for the current segment is updated.

Referring now to box 70, for each pixel, the algorithm checks (using LASTLINE[X] and CURSEG) if the pixel immediately above IS set, but IS NOT in the same segment. If both of these conditions are met, the two segments numbered LASTLINE[X] and CURSEG are merged (box 80). In this way the algorithm detects that two partially collected segments are actually a single segment. The two segments are combined adding the inertial information (to be further described below) for each segment.

There is also a possibility of multiple merges, where a previously merged segment may be subject to a further merge. Suppose a segment (S3) was previously based on S2, as a result of a previous merge of S2 and S3. When S2 is merged into S1, and becomes based on S1, S3 must also be merged into S1. That is, for each segment S:

IF BASESEG[S]==S2 THEN BASESEG[S]=S1

As the algorithm proceeds, the inertia arrays accumulate a set of 'inertial' values for each segment detected so far. In the preferred embodiment, these values are:

n, the number of pixels in the segment;

sx, the sum of the x-coordinate values (the numerical sum of the x-coordinate value for each pixel of the segment);

sy, the sum of the y-coordinate values (the numerical sum of the y-coordinate value for each pixel of the segment);

sxx, the sum of the squares of the x-coordinate values (see above);

syy, the sum of the squares of the y-coordinate values (see above); and sxy, the sum of the products of the x- and y-coordinate values for the pixels in the segment (see above).

For each new pixel assigned to a segment, the information pertaining to that pixel must be assimilated into the inertial values for that segment. The summation values are therefore recalculated taking into account the coordinate information of the new pixel.

Referring to box 85, once processing of a pixel is complete (including any necessary inertia value accumulation and segment creation and merging as appropriate), the segment number (CURSEG) for that pixel is recorded (in LASTLINE[X]) for future use.

When all scan lines are complete, there may be many allocated segments. Some are no longer of interest, having been merged into other segments. Thus a scan is made of allocated segments, searching for base segments (BASESEG[SEG]==SEG). It is also possible for the program to be arranged to discard segments which are determined during post-scan analysis to be very small (fewer than a user-chosen threshold number of pixels).

Referring to FIGS. 2 to 4, three scan examples are shown, which indicate the segment allocated to each pixel as it is encountered during a scan. FIG. 2 shows a segment 1 involving a simple scan and no merging. Each set pixel is identified as being part of segment 1 as it is scanned.

FIG. 3 shows a segment 2 involving a merge operation. The third scan line finds the pixel marked 3, and does not recognise this as part of segment 2. However, at the point marked !, the algorithm detects that segment 3 is actually part of segment 2. The merge is made at that time (the will actually be recorded as 2 in LASTLINE).

FIG. 4 shows a number of set pixels which are all eventually subsumed into segment 1. The numbers indicate the segment originally assigned to each point as it is encountered in the scan, and as saved in LASTLINE.

At the end of the first scan line, BASESEG={1,?,?}.

At the end of the second scan line, BASESEG={1,2,?}.

Just before point '+', BASESEG={1,2,3}.

At point '+', segment 3 is merged with segment 2, BASESEG={1,2,2}.

At point '#', segment 2 is merged with segment 1. The basic merge rule sets BASESEG={1,1,2}. The extra rule to allow for multiple merges sets BASESEG={1,1,1}.

Therefore, at point '?', the pixel is immediately identified as part of segment 1.

It will be appreciated that an important advantage of the present invention is that the inertial information is linear, and that it can therefore be collected using simple accumulator registers for each segment. In this way it is possible to identify segments in an image and to summarise the size, shape, position and orientation of each segment very quickly. At the end of the single pass, this summary information is provided directly. One example of an application for this summary information is the use of the 'running total' values for each segment as 'best fit ellipse' summary values when the scan is complete. Source code illustrating this application is provided in Appendix 2 below.

It will be understood that the single scan image segmentation and summarisation described above provides the following advantages:

it provides a significant speed advantage in comparison to existing processing methods;

it produces summary information without the need for further processing steps.

It will be appreciated that alternative embodiments to that described above are possible. For example the values may be weighted by a 'strength' of each pixel, defined in an application dependent manner. This use of weightings can be used to good advantage when processing a grey scale image where a threshold value T is used to determine whether a particular pixel of intensity v is an 'active' pixel that may contribute to a segment (v>T). To reduce the criticality of the choice of T, we may introduce a range above T (from T to T+R) in which pixels only have a limited contribution. Pixels with intensity value v>T+R are given a full weight w=1. Pixels with intensity values in the range T to T+R are given a weight w=(v−T)/R. These weights are used in accumulation of inertia values, for example n[curseg]+=w; and sx[curseg]+=w*x.

Furthermore, in the preferred embodiment described above, segmentation is defined by left/right/over/under adjacency, but NOT diagonal adjacency. However diagonal adjacency may be permitted to force the merging of segments.

The algorithm may also include a threshold process for a multi-level image in order to define 0 or one background, and 1 or more foreground segments. Additionally the algorithm may permit several different segment types (e.g. black(background), white, red, green and blue).

The program and its algorithm described above finds the summaries for the segments, but does not leave a record for the segments themselves. However, this may be provided by either recording an image sized array for the segment assigned, or by adding a second scan, which replaces the segment assigned to each pixel by the base segment value PIXEL(x,y)=BASESEG(PIXEL(x,y))

Finally, it will be appreciated that the precise methodology of the algorithm may vary from that described above whilst substantially maintaining the same function and results. For example, the method described above of assigning a segment index to each pixel upon identification and then, followed by a comparison of segment assignments of the contiguous pixel to the left and then the contiguous pixel above could be performed using a number of different permutations.

Furthermore, the determination of summary values using x-axis and y-axis cumulative coordinate values of the pixels may use an alternative method to the summation method described above and shown below in Appendix 2.

Appendix 1

The following is sample code, which has been implemented to incorporate the invention:

```c
void MergeSegs(UINT to, UINT from) {
    UINT i;

// accumulate into TO
    stats[to].n += stats[from].n;
    stats[to].sx += stats[from].sx;
    stats[to].sy += stats[from].sy;
    stats[to].sxx += stats[from].sxx;
    stats[to].syy += stats[from].syy;
    stats[to].sxy += stats[from].sxy;

// clear from (just in case of reuse)
    stats[from].n = 0;
    stats[from].sx = 0;
    stats[from].sy = 0;
    stats[from].sxx = 0;
    stats[from].syy = 0;
    stats[from].sxy = 0;

// accomodate cumulative merges
    for (i=1; i<=lastusedseg; i++) {
        if (baseSeg[i] == from) baseSeg[i] = to;
    }

} // mergetstats define NOTNEW 0xffffffff
UINT thresh = 200;  // threshold value to count as 'white'
void MakeSegs(char *bits, UINT H, UINT W) {
    UINT register x;
    UINT y,k=0,n=0;
    UINT lastline[1000];  // remember values on last line
    unsigned char register *pos;

lastusedseg = 0;  // last used segment numbner

// first pass, set up lastline
    for(x=0; x<W; x++) {
        lastline[x] = 0;
    }
```

```
// now start scan for real
memset(&stats, 0, sizeof(stats));
memset(&baseSeg, 0, sizeof(baseSeg));
pos = bits;
for(y=0; y<H; y++) {
   for(x=0; x<W; x++) {        // ...20a..., ...90a...
      // heart of algorithm, found a new segment
      if (*pos >= thresh) {    // ...30a...
         UINT startseg;  // x where new segment started, -1 (NOTNEW) if not
         UINT startover; // value of overhead where segment started
         UINT curseg;    // current seg // allocate a new segment if necessary
         startover = lastline[x];
         if (startover) {          // optimize ...60(part1)... / ...80...
            curseg = baseSeg[startover]; // use overhead seg immediately
            startseg = NOTNEW;
         } else {
            lastusedseg++;  // allocate new segment ...60(part1)...
            if (lastusedseg >= NSEGS-10)
               goto endup;  // if room
            curseg = lastusedseg;  // use new segment
            baseSeg[curseg] = curseg;  // ...60(part2)... set it up to look real
            startseg = x;
         } for(x=x; *pos >= thresh; x++) {  // scan region ... 20b ..., ...30b...
            UINT over;  // value of pixel over
            if (x == W) goto endscan;  // end of line ...90b...
            over = lastline[x];
            if (over != 0 && baseSeg[over] != curseg) { // segment to merge
               MergeSegs(baseSeg[over], curseg);        // ...70... Yes // reuse the segment number it it was just a temporary one
               if (startseg != NOTNEW) { // (optimization not in flow chart)
                  UINT xx;
                  _ASSERTE(curseg == lastusedseg);
                  // remove reference to curseg in previous pixels
                  for(xx = startseg; xx < x; xx++) {
                     _ASSERTE (lastline[xx] == lastusedseg);
                     lastline[xx] = over;
                  } // scan back removing need for new segment
                  // and remove curseg
                  lastusedseg--;
                  _ASSERTE(lastusedseg >= 1);
                  startseg = NOTNEW;
```

```
            } curseg = baseSeg[over];
        } // segment to merge

// add to correct stats ...60(part3)...
        stats[curseg].n++;
        stats[curseg].sx += x;
        stats[curseg].sy += y;
        stats[curseg].sxx += x*x;
        stats[curseg].sxy += x*y;
        stats[curseg].syy += y*y;

pos++;              // ...20b...
        lastline[x] = curseg;   // ...85b...

} // scan to end of set pixels
    } // found first set pixel of run
    pos++;              // ...20a...
    lastline[x] = 0;        // ...85a...
endscan: {}
    } // scan x
  } // scan y endup: {} // skip here if run out of segment space } // makesegs.
```

Appendix 2

The following is sample code which calculates the 'best fit' ellipse (use of inertia information for each segment at scan completion):

```
// code to calculate 'best fit' ellipse for segment seg
// (this is standard geometric code)

// To compute from accumulated register values n, sx, sy, sxx, sxy, syy
//
// n: number of pixels
// (x,y): centre point
// a, b: lengths of long and short axis of ellipse
// s, c: sine and cosine values to give orientation of ellipse // extract summary information from segment
x = sts.sx / n;    // (x,y) is centre of ellipse
y = sts.sy / n;
xx = sts.sxx / n - x*x;
yy = sts.syy / n - y*y;
xy = sts.sxy / n - x*y;

det = xx*yy - xy*xy;
trace = xx + yy;
aa = (trace + sqrt(trace*trace - 4*det)) / 2;
bb = (trace - sqrt(trace*trace - 4*det)) / 2;
a = sqrt(aa);     // a is length of major (longer) axis
b = sqrt(bb);     // b is lenght of minor (shorter) axis aaaabbbb = aa*aa - bb*bb;
if (aaaabbbb >= 1e-10) {
    cc = (aa*xx - bb*yy) / aaaabbbb;
    ss = (aa*yy - bb*xx) / aaaabbbb;
    negquad = xy > 0 ? -1 : 1;
    s = sqrt(ss) * negquad;  // s and c give sine and cosine for orientation
    c = sqrt(cc);
} else {  // nearly round, choose arbitrary angle
    s = 1;
    c = 0;
}
```

What is claimed is:

1. A computer-implemented method for processing a plurality of pixels representing at least a portion of an image, comprising the steps of:
   scanning a pixel in the plurality of pixels to determine if the pixel contains image information of significance;
   in response to the pixel containing image information of significance, determining if only an immediately previously scanned single pixel (single pixel) contains image information of significance;
   in response to the single pixel containing image information of significance, assigning the pixel to an existing image segment of the single pixel;
   in response to the single pixel not containing image information of significance, creating a new image segment and assiging the pixel to the new image segment;
   in response to the assigning or creating steps, updating inertia information for either the new image segment or the existing image segment, respectively;
   (a) determining if only a single, previously scanned pixel adjacent to the pixel (adjacent pixel), that is not the single pixel, contains image information of significance;
   (b) determining if the adjacent pixel assigned to an image segment that does not include the pixel;
   in response to steps (a) and (b) being true, merging the new image segment or the existing image segment, respectively, that includes the pixel, with the image segment; and
   repeating all previous steps for a next sequential pixel of the plurality of pixels.

2. The method of claim 1, wherein the immediately previously scanned single pixel is immediately to the left of the pixel and the adjacent pixel is immediately above the pixel.

3. The method of claim 1, wherein the merging step comprises summing the inertia information of either the new image segment or the existing image segment, respectively, with inertia information of the image segment, thereby merging the new image segment or existing image segment into the image segment.

4. An image processing system for processing a plurality of pixels representing at least a portion of an image, comprising:
   scanning means for scanning a pixel in the plurality of pixels to determine if the pixel contains image information of significance;
   in response to the pixel containing image information of signicance, processing means for determining if only an immediately previously scannned single pixel contains image information of significance;
   in response to the single pixel containing image information of significance, the processing means for assigning the pixel to an existing image segment of the single pixel;
   in response to the single pixel not containing image information of significance, the processing means for creating a new image segment and assigning the pixel to the new image segment;
   in response to the assigning or creating steps, the processing means for updating inertia information for either the new image segment or the existing image segment, respectively;
   (a) the processing means for determining if only a single, previously scanned pixel adjacent to the pixel (adjacent pixel), that is not the single pixel, contains image information of significance;
   (b) the processing means for determining if the adjacent pixel is assigned to an image segment that does not include the pixel;
   in response to steps (a) and (b) being true, the processing means for merging the new image segment or the existing segment, respectively, that include the pixel, with the image segment; and
   the processing means for repeating all the previous steps for a next sequential pixel of the plurality of pixels.

5. The system of claim 4, wherein the immediately previously scanned singel pixel is immediately to the left of the pixel and the adjacent pixel is immediately above the pixel.

6. The system of claim 4, wherein the processing means for merging comprises summing the inertia information of either the new image segment or the existing image segment, respectively, with inertia information of the image segment, thereby merging the new image segment or existing image segment into the image segment.

7. A computer program product stored on a computer operable medium containing instructions effective, when executing in a data processing system, to cause the data processing system to process a plurality of pixels representing at least a portion of an image, the computer program product comprising;
   instructions for scanning a pixel in the plurality of pixels to determine if the pixel contains image information of significance;
   in response to the pixel containing image information of significance, instructions for determining if only an immediately previously scanned single pixel contains image information of significance;
   in response to the single pixel containing image information of significance, instructions for assigning the pixel to an existing image segment of the singel pixel;
   in response to the singel pixel not containing image information of significance, instructions for creating a new image segment and assigning the pixel to the new image segment;
   in response to the assigning or creating steps, instructions for updating inertia information for either the new image segemnt or the existing image segment, respectively;
   (a) instructions for determining if only a singel, previously scanned pixel adjacent to the pixel, that is not the single pixel, contains image information of significance;
   (b) instructions for determining if the adjacent pixel is assigned to an image segment that does not include the pixel;
   in response to steps (a) and (b) being true, instructions for merging the new image segment or the existing image segment, respectively, that includes the pixel with the image segment; and
   instructions for repeating the above steps for a next sequential pixel of the plurality of pixels.

* * * * *

UNITED STATES PATENT AND TRADEMARK OFFICE
CERTIFICATE OF CORRECTION

PATENT NO. : 7,054,486 B2
APPLICATION NO. : 10/062368
DATED : May 30, 2006
INVENTOR(S) : Stephen James Todd It is certified that error appears in the above-identified patent and that said Letters Patent is hereby corrected as shown below:

Column 15, Line 16: Delete "assiging" and replace with --assigning--.

Column 16, Line 8: Delete "include" and replace with --includes--.
              Line 38: Delete "singel" and replace with --single--.
              Line 39: Delete "singel" and replace with --single--.
              Line 46: Delete "segemnt" and replace with --segment--.
              Line 48: Delete "singel" and replace with --single--.

Signed and Sealed this

Twenty-first Day of November, 2006

JON W. DUDAS
*Director of the United States Patent and Trademark Office*